US007930167B2

(12) United States Patent
Young et al.

(10) Patent No.: US 7,930,167 B2
(45) Date of Patent: Apr. 19, 2011

(54) VIDEOGAME LOCALIZATION USING LANGUAGE PACKS

(75) Inventors: Jonathon Young, Dublin (IE); Antonio Vargas Garcia, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 537 days.

(21) Appl. No.: 12/023,991

(22) Filed: Jan. 31, 2008

(65) Prior Publication Data

US 2009/0198789 A1 Aug. 6, 2009

(51) Int. Cl.
*G06F 17/28* (2006.01)
(52) U.S. Cl. .................. 704/8; 704/2; 704/10; 709/246
(58) Field of Classification Search .................. 704/8, 2, 704/10, 9; 709/246; 719/313; 715/536; 463/44; 717/105
See application file for complete search history.

(56) References Cited

U.S. PATENT DOCUMENTS

| | | | |
|---|---|---|---|
| 6,993,569 B1 | 1/2006 | Rees, Jr. ........................ 709/217 |
| 2003/0182632 A1* | 9/2003 | Murdock et al. .............. 715/536 |
| 2004/0157655 A1* | 8/2004 | Tsugiiwa .......................... 463/9 |
| 2005/0043092 A1 | 2/2005 | Gauselmann .................. 463/36 |
| 2005/0108433 A1 | 5/2005 | Wu et al. ....................... 709/246 |
| 2005/0227768 A1 | 10/2005 | Blackburn et al. .............. 463/42 |
| 2006/0009282 A1 | 1/2006 | George et al. .................. 463/29 |
| 2006/0242621 A1* | 10/2006 | Ye et al. ........................ 717/105 |
| 2007/0099706 A1* | 5/2007 | Nuta et al. ...................... 463/44 |
| 2007/0124675 A1 | 5/2007 | Ban et al. ...................... 715/703 |
| 2009/0112577 A1* | 4/2009 | Gifford et al. .................... 704/9 |
| 2009/0113445 A1* | 4/2009 | Sakashita et al. ............. 719/313 |

OTHER PUBLICATIONS

"Game localization," Game Localization Network Ltd., http://www.gamelocalization.net/localization_game.html, 2005, 1-2.
Gustafsoon, Robert., "Localization of Computer Games," http://www.nada.kth.se/utbildning/grukth/exjobb/rapportlistor/2007/rapporter07/gustafsson_robert_07035.pdf, 2007, 1-43.

* cited by examiner

*Primary Examiner* — Le Luu
(74) *Attorney, Agent, or Firm* — Woodcock Washburn LLP (57) ABSTRACT

A code library, or "language interface pack" library, is provided that can be integrated into a video game to detect new localizations of the video game dynamically, and to locate and load the most appropriate localized resources depending on user preferences and available localized game content. If no localized content is available in the preferred language, a fallback system ensures that the game always receives the location of existing game content in another language.

20 Claims, 8 Drawing Sheets

VIDEOGAME LOCALIZATION USING LANGUAGE PACKS

BACKGROUND

When video games are developed today, the selection of languages supported is hard-coded into the game code. Subsequently, if the game developer wishes to release a new localization of an existing game, it must re-work the code to add support for the new language. This increases costs and diminishes the likelihood that video games will support new languages.

Language pack technologies have been deployed on the WINDOWS® platform through its Multilingual User Interface (MUI) support, available for example in NET® and VISTA®. However, these technologies have not been effectively adapted for use in the video game field. To take advantage of existing MUI technology, game developers must use either the managed code resources of the NET® framework, or MUI-specific Win-32 resources, presently compatible with VISTA® only. There is no MUI-type technology built into game consoles, such as the XBOX 360® platform, console operating systems, or games themselves, that handles retrieval of language appropriate resources in a fast, memory efficient way with minimum development time overhead.

In view of these and other shortcomings in the art, systems, methods, and computer readable media are needed for videogame localization using language packs.

SUMMARY

In consideration of the above-identified shortcomings of the art, the present invention provides systems, methods, and computer readable media for videogame localization using language packs. In one embodiment, a code library, or "language interface pack" library, is provided that can be integrated into a console video game to detect new localizations of the video game dynamically, and to locate and load the most appropriate localized resources depending on user preferences and available localized game content. If no localized content is available in the preferred language, a fallback system ensures that the game always receives the location of existing game content in another language. Among other advantages, this allows for language dialects to be supported which leverage their base languages (e.g. Latin American Spanish derives from International Spanish). Also, new languages can be subsequently added to a video game with much reduced development time and cost. As localization itself usually yields higher sales (compared to sales where no localization exists) the invention has the potential to bring higher returns to game developers as more languages are supported. Other advantages and features of the invention are described below.

BRIEF DESCRIPTION OF THE DRAWINGS

The systems and methods for videogame localization using language packs in accordance with the present invention are further described with reference to the accompanying drawings in which.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

In one exemplary scenario, a localizable video game developed according to an embodiment of the invention may be initially released in English, French and German. Two months later, the game developer may want to localize the video game into Polish and release into Poland. To minimize localization costs, the game developer decides to only localize the user interface (UI) text and subtitles, but not the voice over (which was localized into English, French and German).

According to an illustrative embodiment, the Polish UI and subtitles resources can be packaged into a Polish language pack for the video game and tested. This language pack need only contain content, not new code. The language pack can be made available for example on a computing network, such as the XBOX LIVE® Marketplace, as content for the video game that can be downloaded.

Because the video game was designed to be localizable using pluggable language packs according to an embodiment of the invention, the game developer's desired localization can be used by existing customers that purchased the version of the video game without Polish on the video game disc. Once the Polish language pack is downloaded, the video game can use the Polish UI and subtitles, assuming the user prefers Polish to the other available languages. As the voice-over was not included in the Polish language pack, the game will continue to use the existing localized audio material depending on user's preferences, as may be read from system settings.

The game developer may decide to include the Polish language pack on subsequent released versions of the video game. Simply by adding the language pack to the video game disc, and without any substantial further integration work, the Polish localization will be available to those who purchase the new disc.

Figure 1:
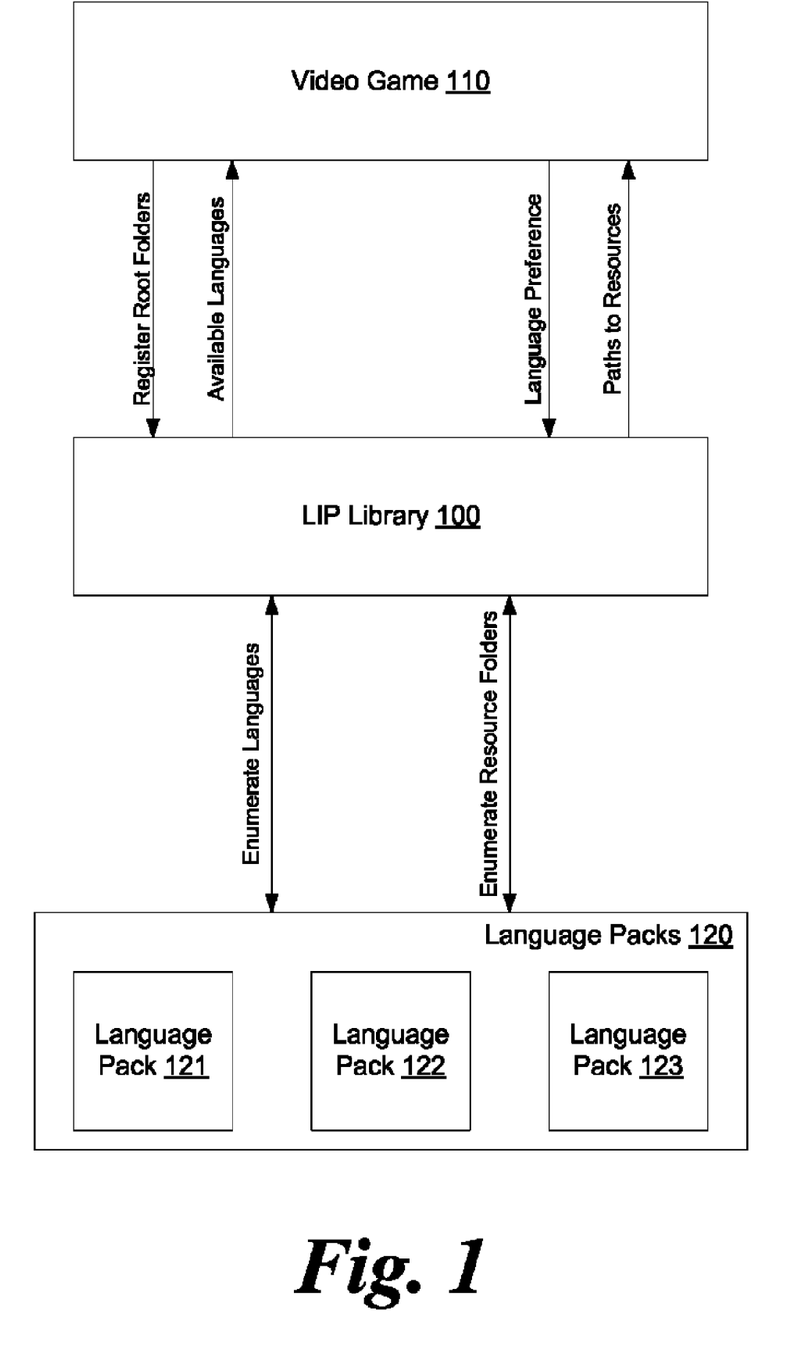
FIG. 1 illustrates a video game using a library to access localization features.

In one exemplary embodiment, videogame localization using language packs can be implemented using a code library, referred to herein as the Language Interface Pack (LIP) library, as illustrated in FIG. 1. The LIP library 100 can be deployed between video game 110 software and localized language packs 120, comprising language packs 121, 122, and 123, which contain localized game resources, such as text, graphics, audio, subtitles, and video. The LIP library 100 can be used by the video game 110 to access the localized game resources in the language packs 121-123.

The LIP library 100 enables a video game application 110 to use LIPs 121-123, also referred to herein as "language packs," to group resources related to a specific language as a unit that can be later added/removed. This is done with a certain level of abstraction, in such a way that the game developer needs only to be aware of the basic structure of the resources within a language pack, but needs not to know whether the language pack is installed or not, or care about choosing the best language for a specific player, or falling back when resources are not found for a specific language.

The LIP library 100 can be included with video game software itself, e.g. as a set of computer readable instructions on a computer readable medium that also contains a video game application 110. In this embodiment, the LIP library 100 can be integrated with video game software.

In one advantageous arrangement, the LIP library 100 can be initially distributed to game developers as part of a Software Development Kit (SDK). For example, the makers of certain video gaming platforms, such as the XBOX® and PLAYSTATION®, as well as Personal Computer (PC) based gaming platforms and others, may send an SDK containing a LIP library 100 to developers of video games for their respective platform. The LIP library 100 is then integrated by video game developers into video game applications.

Thus, in one embodiment, a computer readable medium with computer executable instructions for a software development kit is provided. The software development kit facilitates developing localizable video games. The computer readable medium may thus include instructions for a LIP library 100 for integration into a video game 110. The LIP library 100 may comprise instructions for receiving a language preference, e.g. from video game 110 as illustrated in FIG. 1, and instructions for providing to a video game 110 a plurality of paths to localized video game resources, as available from language packs 121-123. More specifically, most recent versions of localized video game resources corresponding to said language preference can be returned, for example by selecting a language pack 121-123 reflecting a latest version of the preferred language. When certain resources are not available in a language pack 121-123, paths to fall-back video game resources can be provided by the LIP library 100 to the video game 110.

Alternatively, it will be appreciated that a LIP library 100 can be made available in other ways, for example as a part of an operating system or other software that ships with a video gaming platform. In such scenarios, video game developers can be provided with the appropriate Application Program Interfaces (APIs) to cause video games such as 110 to access the LIP library 100.

Therefore, in another embodiment, a computer readable medium may be provided with computer executable instructions for a localizable video game, e.g. a video game that includes the LIP library 100 described above. Such a computer readable medium may include instructions for a video game 110, and instructions for a language interface pack library 100 as described above. The instructions for a video game 110 may include, for example, instructions for displaying provided resources, e.g., by integrating video game resources from the various language packs 121-123 (or fallback resources) identified by provided paths into the video game content that is displayed.

In the above embodiments, the computer readable medium may further include instructions for carrying out additional features of the LIP library 100. For example, as illustrated in FIG. 1, the video game 110 may include instructions for registering root folders, as described further below, and the LIP library 100 may further comprise instructions for providing to said video game 110 a list of languages available for said video game 110. The LIP library 100 may further comprise instructions for providing a list of languages available for a specific resource utilized by said video game 110. For example, a list of available languages for use in the game's UI may be provided, or a list of available voice-over languages may be provided.

Figure 2:
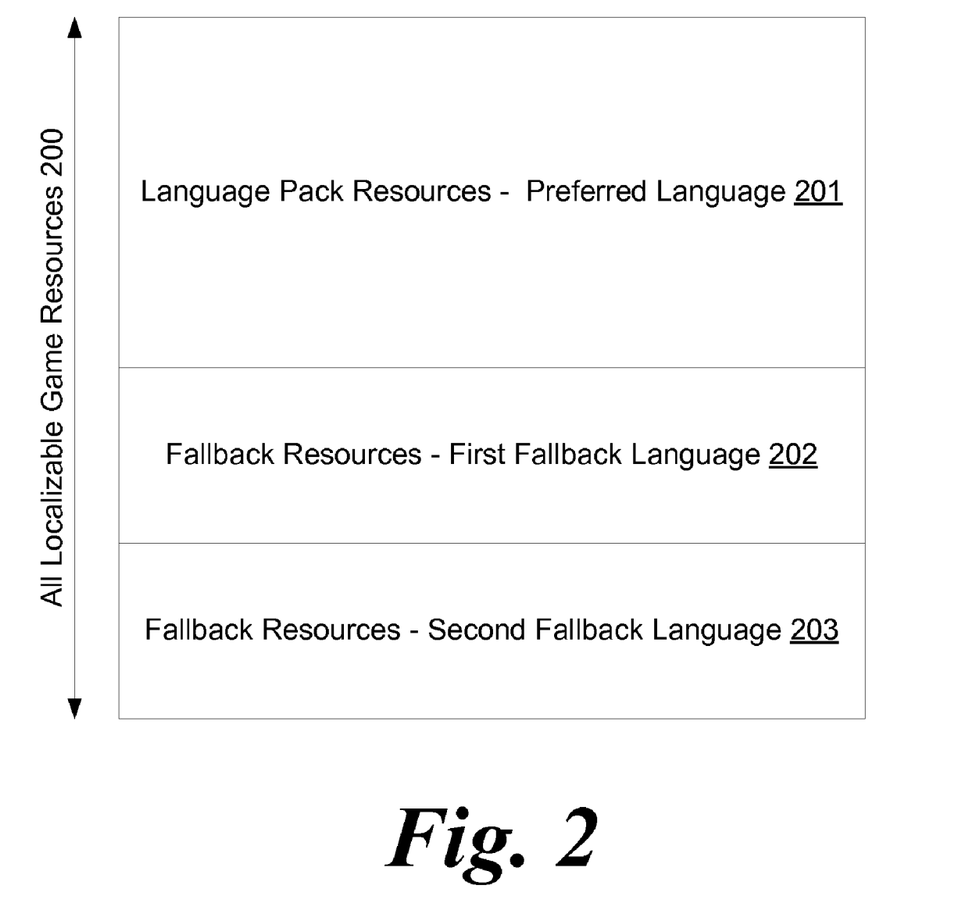
FIG. 2 illustrates the use of "best available" localized resources by falling back on appropriate fallback resources.
Figure 3:
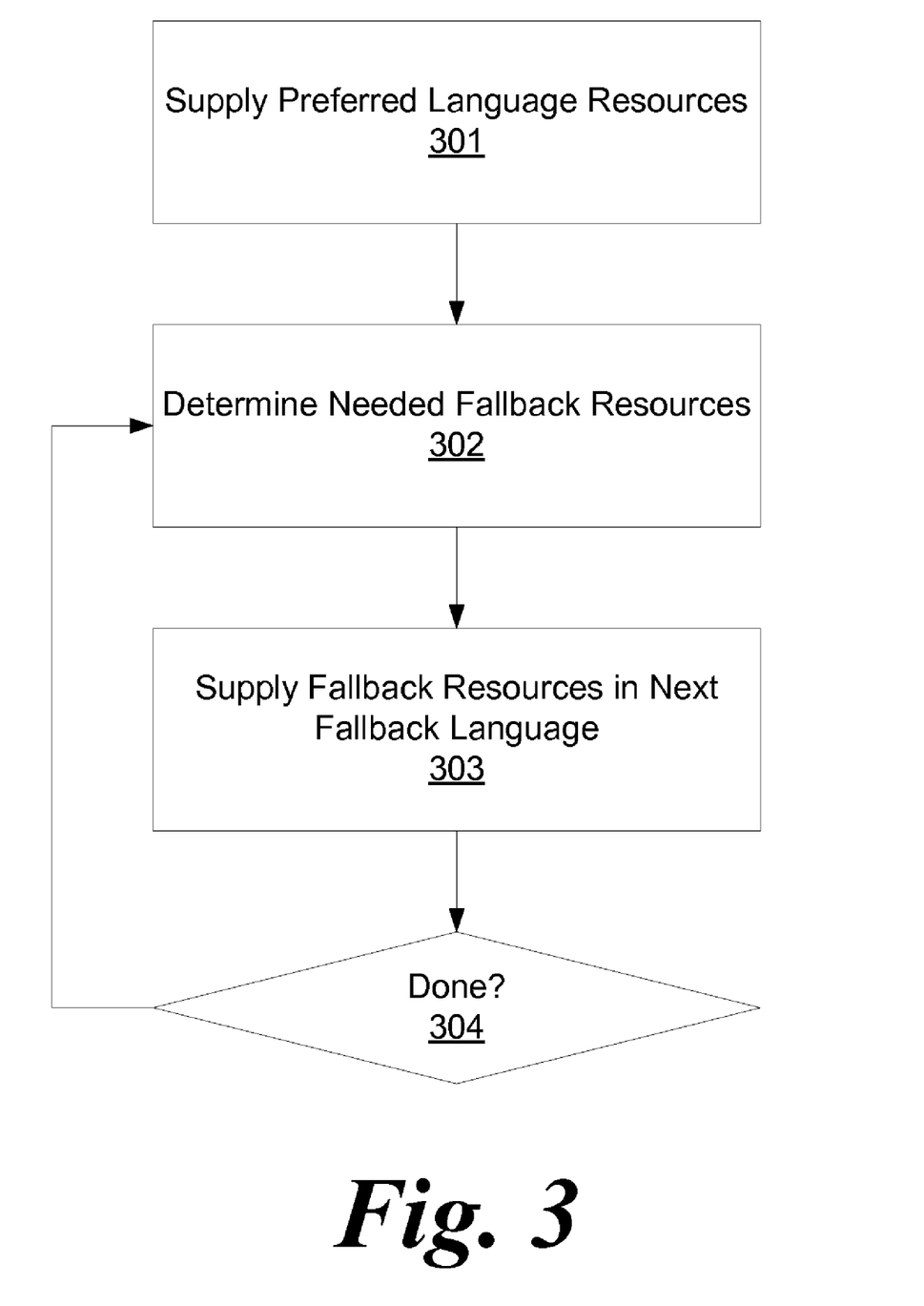
FIG. 3 illustrates a method for supplying best available localized resources.

When resources are not available in a language pack 121-123 corresponding to a language preference, the LIP library 100 can fall back on other resources, as illustrated in FIGS. 2 and 3. FIG. 2 illustrates a quantity of localizable video game resources 200 required by a video game 110. First, any resources available in a latest version of a language pack corresponding to user's preferred language 201 may be provided to the video game 110, as illustrated in step 301 of FIG. 3. However, resources 201 may not comprise all of the localizable resources needed by the video game 110. As described in the scenario above, resources 201 may comprise the localizable UI resources and subtitles, but may not include voiceover resources, certain localizable graphics or video sequences, etc. The LIP library 100 can attempt to localize these additional resources on a "best available" basis.

For example, it may be determined that an additional quantity of localizable resources are needed 302. If so, fallback resources available in a first fallback language 202 may be supplied 303 to supplement resources 201. If not done 304, i.e. if some additional localizable resources are still lacking, a next determination of needed resources can be made pursuant to 302, and these fallback resources in a second fallback language 203 can be supplied 303 to the video game 110. For example, as illustrated in FIG. 2, fallback resources in a second fallback language 203 may be used to supplement the resources 201 and 202 as necessary to get all the needed localizable game resources 200. Additional fallback resources available in other fallback languages may be drawn upon as necessary to get all the needed localizable game resources 200.

Various data and functional elements may be used by the LIP library 100, as described further below, to determine fallback resources that will be needed 302, as well as a language for the fallback resources. The LIP library 100 can also acquire and supply fallback resources 303 in the determined language, and repeat as necessary to get all the localizable resources 200 needed for a video game 110.

Determining a chain of priority for fallback languages can be a function of the LIP library 100 in some embodiments. For example, in one embodiment, a previous version of a preferred language, if available, can top the priority list, while linguistically related languages may be next in priority. If the user's language preference is Portuguese, the LIP library 100 may be configured to fallback to a most closely related romance language, such as French, Spanish, or Italian, for any resources that are not available in any version of a Portuguese language pack. The LIP library 100 may thus contain information comprising linguistically related fallback languages for each language supported by a language pack. In one embodiment, preferred linguistically related fallback languages might be specified in the language packs 121-123 themselves.

Languages identified from other sources may also find a place in the priority chain. For example, a user language setting for a device, such as the video gaming platform, may be relied upon. If the user prefers German for a particular game, but his console settings are to provide English UI for operating system UI, then English is a good choice of language for fallback resources. Similarly, the device system default language may be informative, as may a runtime fallback list built by the LIP library 100 as described further below.

The information sources relied upon in determining a fallback language can be prioritized. For example, it may be determined that user language setting is more often a better bet for fallback resources than the device system default language. In this case, fallback resources in the language of the user's language setting can be used before fallback resources in the device's system default language.

Figure 4:
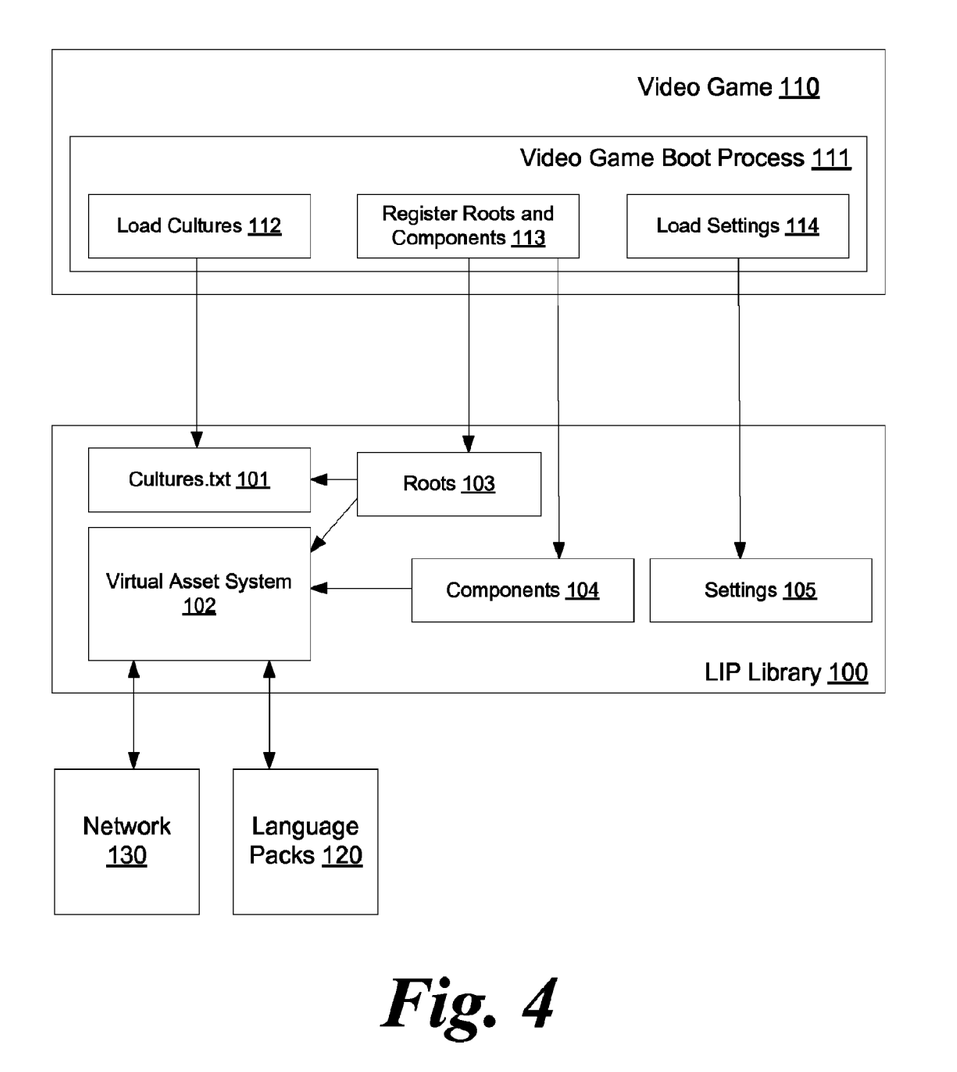
FIG. 4 illustrates a video game boot process interaction with an exemplary library implementation.
Figure 5:
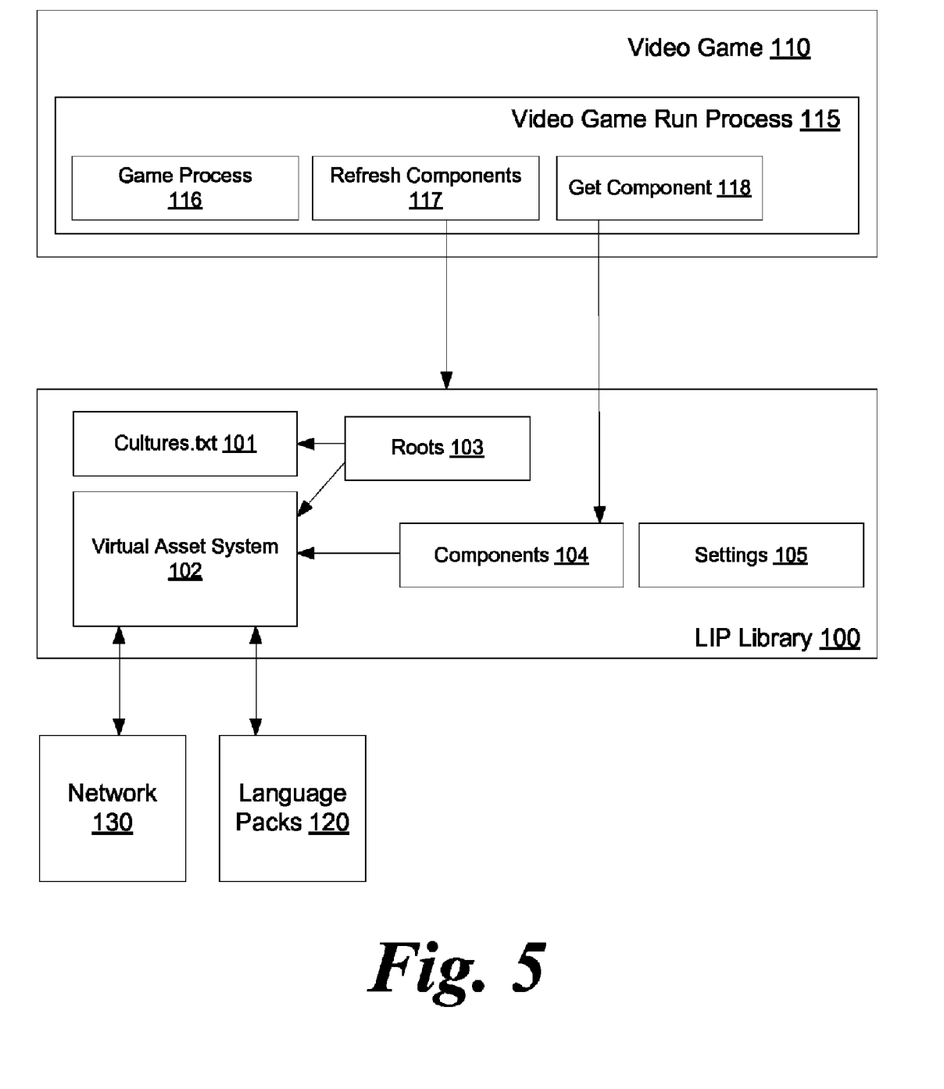
FIG. 5 illustrates a video game run process interaction with an exemplary library implementation.

FIGS. 4 and 5 provide an exemplary implementation-specific architecture for the video game 110 and LIP library 100. Certain terms are used herein to describe a specific implementation. The term "LIP" as used herein refers to a Language Interface Pack, also called a "language pack", which comprises a plurality of resources associated with a particular language. The term "resource" as used herein refers to any file, or other type of content, that provides potentially-localizable information (e.g., a string, graphics, etc.). The term "component" as used herein refers to the basic unit that the LIP library operates on. The component links a set of resources to a game-specified name which can be later used as a parameter in any of the library API calls. The mapping used by the library is Component path ⇆ Component name. The term "root" as used herein describes a root folder from which the Component paths are to be calculated. There can be as many roots as a video game specifies, but only one root may have a specific component/language combination (e.g. the "English" version of the "Video" component can't hang from two different roots at runtime).

Referring to FIG. 4, the video game boot process 111 occurs during boot of the video game 110. This process can comprise loading cultures 112, registering roots and components 113, and loading settings 114. In one embodiment, these operations may be performed sequentially.

Loading cultures 112 can comprise, e.g., loading a cultures.txt file 101 in the LIP library 100. Registering roots 113 registers roots 103 and components 104 in the LIP library 100. Loading settings 114 loads settings 105 in the LIP library 100.

Roots 103 and components 104 can interact with the virtual asset system 102. The virtual asset system 102 can acquire resources from, e.g., language packs 120 as may be available on a game disc, or from a network 130 location such as a server affiliated with a live gaming service.

In accordance with FIGS. 4 and 5, a feature of the LIP library 100, or optionally for a video game 110 making use of a LIP library 100, may comprise instructions for retrieval of at least one new localized video game resource from a network 130. Using such instructions, the LIP library 100 can acquire additional language packs, as well as additional resources for a language pack as such resources become available. The retrieval and integration of new resources into a game advantageously does not require recompilation of the video game binary.

FIG. 5 illustrates a video game run process 115 comprising a game process 116, refresh components 117, and get component 118. In one embodiment, refresh components 117 and get component 118 can be performed while game process 116 is running. LIP library 100 may comprise instructions for updating paths to most recent versions of localized video game resources corresponding to a language preference, and paths to fallback video game resources, while said instructions for a video game execute on a computing device. This allows the video game 110 to initiate a refresh of available localized resources, and to receive paths to the refreshed resources from the LIP library 100 in response. In other words, the invention can support real-time refreshes of the localized video game resources.

In accordance with a disclosed embodiment, a computer readable medium with computer executable instructions for a localizable video game may be provided, comprising instructions for a video game 116, and instructions for performing an update, which may include 117 and instructions in LIP library 100 for performing the update, of localized video game resources corresponding to a language preference for said video game, wherein said instructions for performing an update are executable while also executing said instructions for a video game 116. The instructions for performing an update can access, via LIP library 100, a video game disk (e.g. a disk storing language packs 120) via a virtual asset system 102 interface. The instructions for performing an update can also access, via LIP library 100, a networked server 130 via a virtual asset system interface 102.

In one specific implementation, as provided below, the LIP library 100 can comprise the following main characteristics: it may be implemented as a set of global APIs, can be provided to game developers as a LIB and a header (.H) file to be linked into a game project, can require explicit initialization and finalization in order to completely cleanup resources used during runtime, and can provide several customization layers including memory management, assertion handling, pre-allocation hints, and virtual file system.

Goals for the LIP library 100 may include efficiency both in running time and memory usage when properly configured and initialized; allowing runtime addition of root paths and re-scanning of resources, in order to react to content addition/removal; allowing the game developer to specify the memory management model for allocations/de-allocations of internal structures and objects; providing a good level of logging through the use of assertions and debugger output, to make it easier for game developers to debug user-errors when configuring or using the library; allowing language servicing (through versioning); and providing a way to work on file containers. Not all games will use folders to organize resources. The library should therefore preferably also enable integration into custom containers (e.g. CAB and ZIP).

The LIP library 100 can comprise computer executable instructions that serve two exemplary purposes: component and root management, and language fallback management. The management of components and roots may be performed through the following structures:

Cultures. A culture is the mapping of a culture name (e.g. "en-us") against its native name (e.g. "English (United States)") and its parent (neutral) culture (e.g. "en").

Roots. A root is a base folder off which the components will be searched for.

Components. A component defines a collection of files grouped logically with a name (user-specified) that maps against a path (off any of the registered roots) and (optionally) a file mask under the specified path. At runtime, each component has a collection of links (see below item).

Links. A link maps a component against a root/language. Each link specifies for a given language, which root holds the localized files for the component. Only one language per-root will be present on the links collection of any component.

Languages. A list of all the languages that have been found under any of the registered roots for any of the registered components. Each language contains a multimap that links each version of a language against a specific root. Each root can contain only one version of a language. Versioning of languages is covered in the section for content scan below.

API features may be provided by the LIP library 100 that allow modification of the data contained in the collections described above. Other API features can use data from collections in order to take runtime decisions. The following is a summary of exemplary exported API and how they relate to each collection.

XLipGetCultureInfo: Reads directly from the Cultures collection.

XLipLoadCulturesFromFile: Populates the Cultures collection from a file that contains a table-like (TAB separated values) with the information to parse.

XLipAddRoot: Adds an entry to the Roots collection.

XLipAddComponent: Adds an entry to the Components collection.

XLipRefreshComponents: Populates the Languages collection, as well as the Links entries on each Component item.

XLipEnumLanguages: Reads from the Languages and (optionally) the Components collections.

XLipGetComponentPath: Reads from the Languages, Components and Roots collections.

The management of language fallback may be performed through the following exemplary structures:

User settings: Holds the preferred UI language for the current user (if any has been defined). Can be empty.

System fallback: Holds a list of languages which the platform (either Xbox or Windows) defines as "default" for the current user. Only languages that appear on the Cultures collection (described above) are added to this list.

Runtime fallback: Holds the list of languages which will be used at runtime to query the component paths that are returned on calls to XLipGetComponentPath. The runtime fallback is built by the library and starts with the user preferred language (if any), then it includes the system fallback and, finally, it includes the rest of the languages in the Languages structure (described above) in no particular order.

LIP library 100 may provide API that allow modification of the User settings data, as well as refreshing the System fallback and the Runtime fallback. In one embodiment, the contents of both fallback lists are determined by the LIP library 100 and can't be altered by the game developer, with the exception of the user preferred language, which goes on top of the Runtime fallback list. The following are exemplary LIP library 100 exported API that relate to the above mentioned structures and collections:

XLipSetUserSettings: Sets the language that the user selects as preferred (most probably as a result of the game showing the language selection screen)

XLipLoadUserSettings: Retrieves a previously saved user setting and sets the current runtime user preferred language from it (most probably will happen at game startup)

XLipSaveUserSettings: Saves the current runtime settings so that they can be retrieved the next time the game is started (most probably will happen right after the user changes the settings via the language selection screen)

XLipRefreshComponents: Will refresh the contents of the System fallback and the Runtime fallback collections. It will first enumerate the languages for each component, and populate the Languages collection, because only languages within Languages will be added to the Runtime fallback collection.

Figure 6:
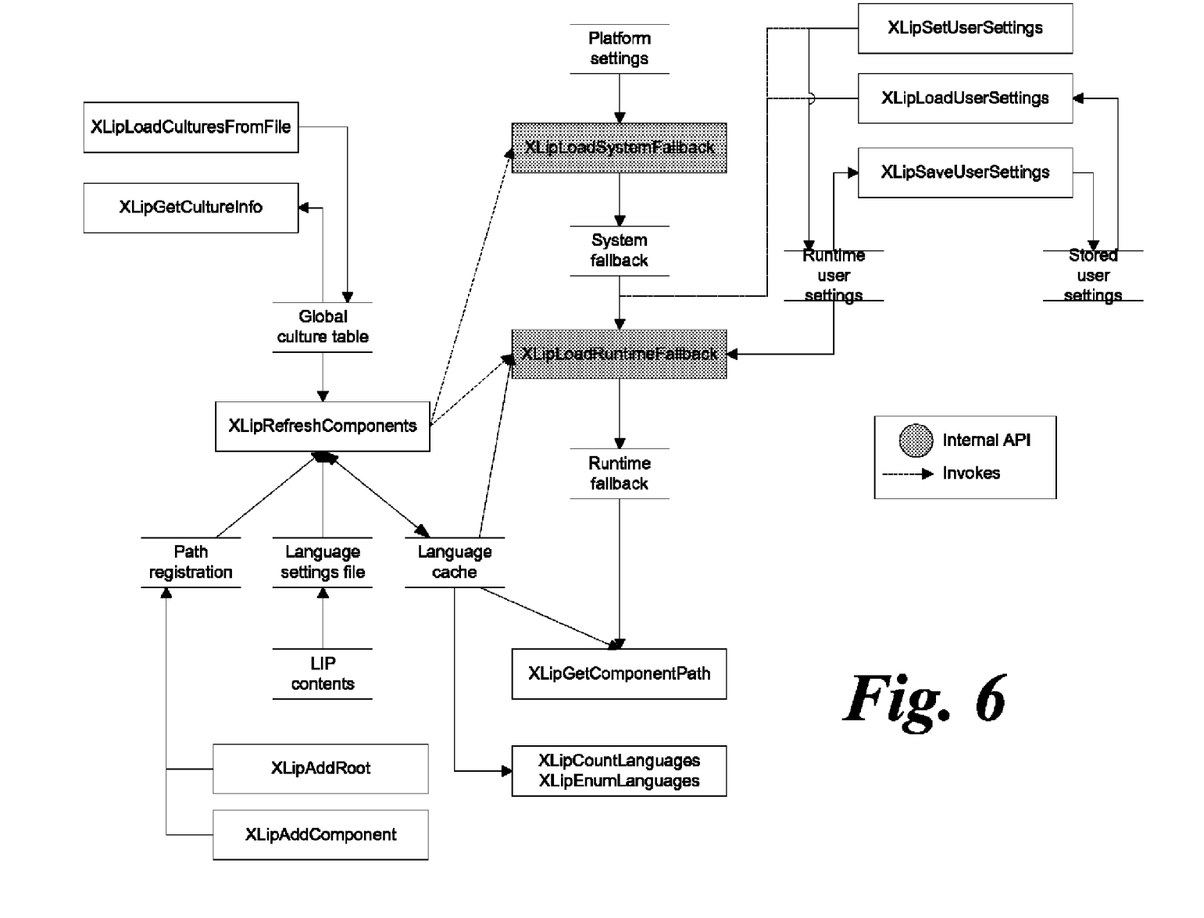
FIG. 6 illustrates interaction of various library API's with data as may be available on a video game platform.

FIG. 6 illustrates how, in one embodiment, several exported API listed above can interact with various data stores maintained by the library.

Exemplary files that may be used in conjunction with a LIP library as disclosed herein include, for example, a culture definition file and a language INI file. The culture definition file is used to describe all the cultures supported by the library. It may be the first thing passed into the library. It is parsed via the public API XLipLoadCulturesFromFile and it populates the Cultures collection described above. The following are exemplary valid culture definition lines as may be included in a culture definition file. Note that the number "1" in the en-au line, and the number "100" in the es-es line provide versions of the corresponding culture definition:

| en-au | English (Australia) | en    | 1     |
| es-es | Spanish (México)    | es-mx | 100   |
| en    | English             |       |       |
| es    | Spanish             | null  | 65534 |

A language INI file may be used to describe a version of a language.

In another aspect, in order for the LIP library 100 to be able to enumerate the contents of file container formats, a Virtual Asset System 102 interface can be included. The Virtual Asset System 102 interface may comprise instructions for performing the following actions:

LONG EnumLanguages: This API can provide the ability to discover which languages are available.

BOOL HasComponent: This API may provide the ability to query whether a specific component is available for a specific language.

BOOL GetComponent: This API may provide the ability to retrieve the game-defined component data for a specific component in a specific language.

BOOL GetLanguageversion: This API can provide the ability to retrieve a version of a specified language.

BOOL XLipAddRoot (IXLIPROOT*pRoot): This API adds the specified root to the collection of roots. Duplicate roots are just ignored.

BOOL XLipRemoveRoot (IXLIPROOT*pRoot): This API removes an existing root from the collection of roots.

BOOL XLipGetComponent (PCSTR pComponent, PCSTR pLanguage, IXLIPCOMPONENT*pComponentOut): This API retrieves the game-specific component data for the requested component and (optionally) the requested language.

There are several additional components that can be integrated into the LIP library 100. Exemplary components within the LIP library 100 may include library initialization, memory management, culture information, component registration/query, and user/language settings.

Library initialization can occur before any call to any other component. It ensures that the correct defaults are set and that internal members are correctly initialized before using them. For example, some of the collection vectors are pre-allocated to avoid memory re-allocation during library runtime. There is also a library finalization API that can be called by a game if there was a need to release all the resources used by the library at any given point of the game. Besides initialization and finalization, configuration options may be provided by the LIP library 100 API. The collections may provide a "hint" configuration value that will be used to pre-allocate the containers upon its first use.

Memory management allows configuration of internal memory allocation and de-allocation. APIs may be provided to specify memory management models, such as use standard malloc/free routines; use a pair of user-defined allocation/de-allocation routines (e.g. XMemAlloc/XMemFree); and use a memory buffer as a pool for allocations—which allows the game developer to pre-allocate memory at game startup time which will be used on all the internal memory allocation calls the library makes.

A culture information component can initialize a culture information store. To do that, a formatted file is loaded that contains such information, which is parsed at runtime and stored for the duration of the game. The library supports any language not defined in such configuration file. During runtime, information about any of these cultures can be queried through exported API. Such information can be useful, for example, when displaying a language selection screen, because the developer will want to show the language names in their native representation.

A component registration/query component may provide a set of public API through which the video game can register roots and components that describe language pack contents. Then, a scan operation launches which will iterate through every component/root searching for the existing languages, which then will be cached in the component collection for faster lookup at runtime. This scan operation can be launched at any time during the game operation to react to events like dynamic content addition—e.g. when new language packs are downloaded and mounted into the game file system. Once the internal cache of languages is populated, the game can query two exemplary pieces of information: A list of existing languages, either for the game in general, or for a specific component, and the path to a certain component, either given a specific language, or relying on the internal settings/fallback mechanisms.

A user/language settings component takes care of the user settings, the system fallback list of languages, and the runtime fallback list of languages. The following are exemplary actions taken by this component:

Load/Save/Set user settings through a set of exported API. The core setting functionality operates on memory buffers that the game developer can redirect to any storage device they currently use, such as a file on a hard drive, a operating system registry setting, or a title-profile setting on a video game console.

Populate the system fallback list.

Populate the runtime fallback list. This is the step of merging the user settings, the system fallback list and the remaining available languages in a list that can be quickly iterated through when the user calls XLipGetComponentPath.

The LIP library can further include computer executable instructions for performing a language content scan. When this function (referred to as, e.g., LipRefreshComponents) is invoked after registering roots and components, the library will go through those roots that are valid and identify which components exist under any valid language contained within that root. An exemplary algorithm for this operation is provided in FIG. 7.

Figure 7:
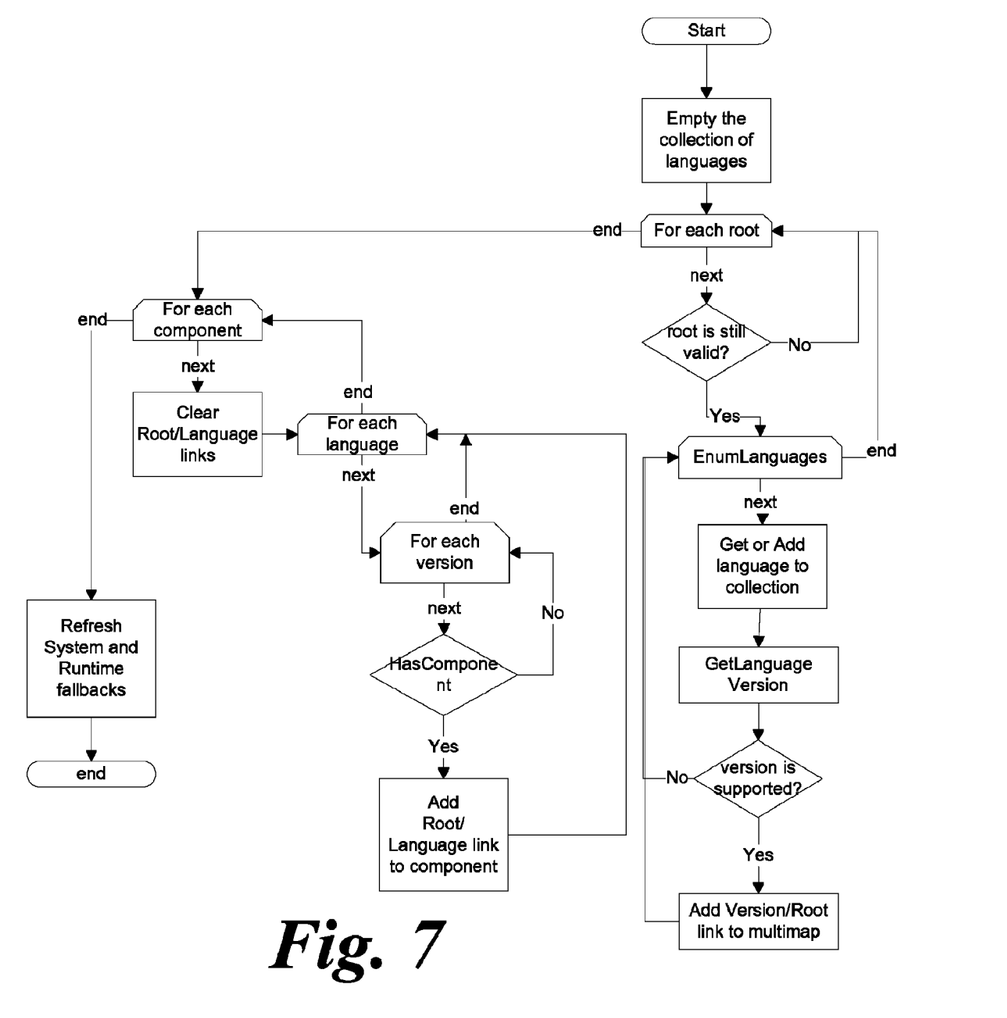
FIG. 7 illustrates an exemplary algorithm for performing a language content scan.

Referring to FIG. 7, The first iteration through the Roots collection looks for all available language folders (e.g. "en-us" for US English). Through this iteration of roots, the collection of Languages is populated. Each language will contain a multimap that links each language version with the root that contains it. When using the file-system implementation of the Virtual Asset Manager, the version of the language is determined by the lang.ini file located directly beneath the culture folder. The collection of versions per language can be a reverse-order multimap. A multimap allows a language version to be split into different roots. This way, two different roots can map to the same language version. The reason it is preferably reverse-order is because to iterate it in decreasing order during the second loop, giving preference to higher-versioned languages and thus, enabling language versioning.

Figure 8:
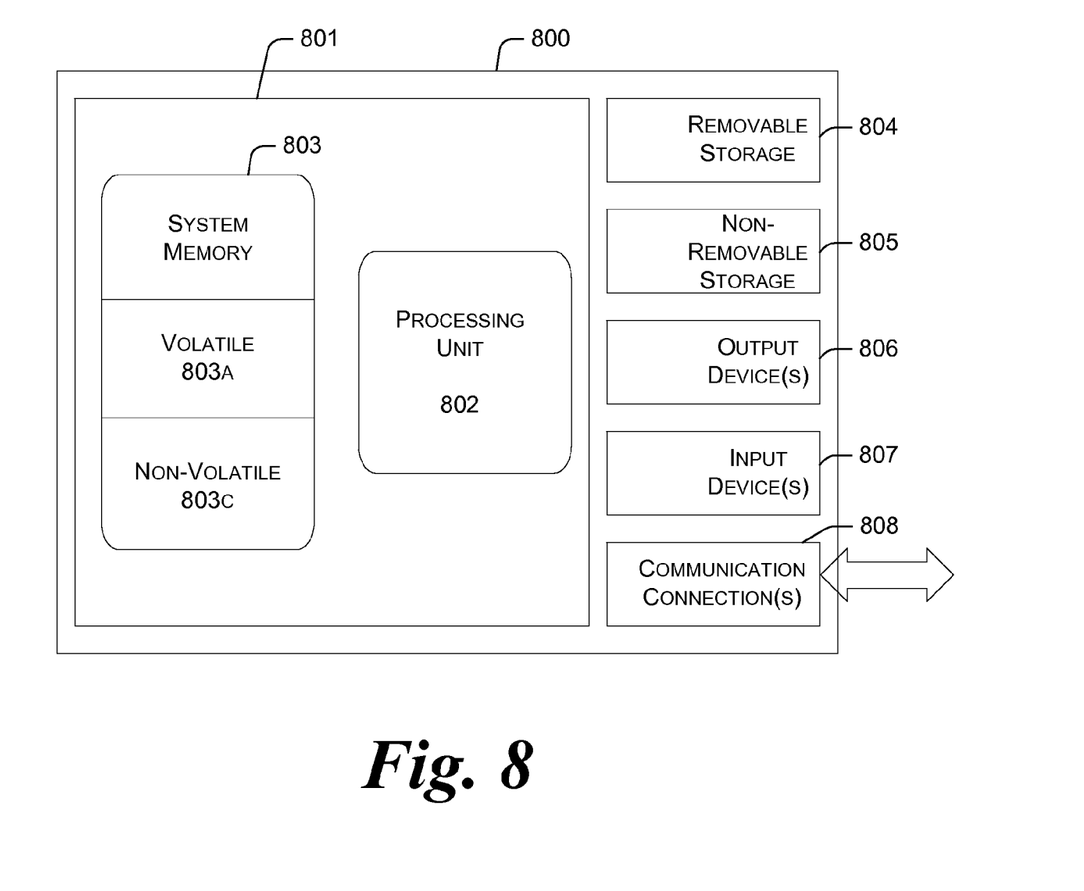
FIG. 8 illustrates an exemplary computing device.

FIG. 8 provides an exemplary computing device 800 suitable for use in connection with the systems and methods of the invention is broadly described. In its most basic configuration, device 800 typically includes a processing unit 802 and memory 803. Depending on the exact configuration and type of computing device, memory 803 may be volatile (such as RAM), non-volatile (such as ROM, flash memory, etc.) or some combination of the two. Additionally, device 800 may also have mass storage (removable 804 and/or non-removable 805) such as magnetic or optical disks or tape. Similarly, device 800 may also have input devices 807 such as a keyboard and mouse, and/or output devices 806 such as a display that presents a GUI as a graphical aid accessing the functions of the computing device 800. Other aspects of device 800 may include communication connections 808 to other devices, computers, networks, servers, etc. using either wired or wireless media. All these devices are well known in the art and need not be discussed at length here.

The invention may be implemented in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Device 800 typically includes a variety of computer readable media. Computer readable media can be any available media that can be accessed by a computer and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

In light of the diverse computing environments that may be built, the systems and methods provided herein cannot be construed as limited in any way to a particular computing architecture. Instead, the present invention should not be limited to any single embodiment, but rather should be construed in breadth and scope in accordance with the appended claims.

The invention claimed is:

1. A computer readable storage medium with computer executable instructions for a localizable video game, said instructions comprising:
   instructions for a video game;
   instructions for a language interface pack library, comprising:
      instructions for receiving a language preference;
      instructions for providing to said video game paths to most recent versions of localized video game resources corresponding to said language preference, and paths to fallback video game resources; and
   instructions for integrating, by said video game, video game resources identified by provided paths into a video game display.

2. The computer readable storage medium of claim 1, said instructions for a language interface pack library further comprising instructions for providing to said video game a list of languages available for said video game.

3. The computer readable storage medium of claim 1, said instructions for a language interface pack library further comprising instructions for providing to said video game a list of languages available for a specific resource utilized by said video game.

4. The computer readable storage medium of claim 1, wherein said fallback video game resources are determined using said language preference.

5. The computer readable storage medium of claim 1, wherein said fallback video game resources are determined from a user setting for a device.

6. The computer readable storage medium of claim 1, wherein said fallback video game resources are determined using a system fallback language for a device.

7. The computer readable storage medium of claim 1, wherein said fallback video game resources are determined using a runtime fallback list of languages for a device.

8. The computer readable storage medium of claim 1, further comprising instructions for retrieval of at least one new localized video game resource from a network.

9. The computer readable storage medium of claim 1, further comprising instructions for updating said paths to most recent versions of localized video game resources corresponding to said language preference, and paths to fallback video game resources, while said instructions for a video game execute on a computing device.

10. A computer readable storage medium with computer executable instructions for a software development kit for developing localizable video games, said instructions comprising:
    instructions for a language interface pack library for integration into a video game, said language interface pack library comprising:
       instructions for receiving a language preference; and
       instructions for providing to a video game a plurality of paths to most recent versions of localized video game resources corresponding to said language preference, and a plurality of paths to fall-back video game resources.

11. The computer readable storage medium of claim 10, wherein a video game resource comprises a text string for a User Interface (UI).

12. The computer readable storage medium of claim 10, wherein a video game resource comprises a subtitles resource.

13. The computer readable storage medium of claim 10, wherein a video game resource comprises a voice over resource.

14. The computer readable storage medium of claim 10, wherein a video game resource comprises a game graphics resource.

15. The computer readable storage medium of claim 10, said instructions for a language interface pack library further comprising instructions for providing to said video game a list of languages available for said video game.

16. The computer readable storage medium of claim 10, said instructions for a language interface pack library further comprising instructions for providing to said video game a list of languages available for a specific resource utilized by said video game.

17. A computer readable storage medium with computer executable instructions for a localizable video game, said instructions comprising:
    instructions for a video game;
    instructions for a plurality of language packs that include localized video game resources corresponding to a language preference for said video game; and
    instructions for a language interface pack library that enables the video game to use at least one language pack in the plurality of language packs.

18. The computer readable storage medium of claim 17, further comprising instructions for performing an update access of a video game disk via a virtual asset system interface.

19. The computer readable storage medium of claim 17, further comprising instructions for performing an update access of a networked server via a virtual asset system interface.

20. The computer readable storage medium of claim 17, wherein said video game includes instructions for a language interface pack library that comprises said instructions for performing an update.

* * * * *